United States Patent [19]

Kulikowski

[11] 3,957,357
[45] May 18, 1976

[54] COMBINED REAR VIEW MIRROR AND SUNVISOR

[76] Inventor: Adolf Kulikowski, Neser House No. F 14, Windhoek, South Africa

[22] Filed: Oct. 1, 1974

[21] Appl. No.: 510,961

[30] Foreign Application Priority Data
Oct. 3, 1973  South Africa.................... 73/7757

[52] U.S. Cl.............................. 350/304; 296/97 R; 350/276 R; 350/307
[51] Int. Cl.².......................................... G02B 5/08
[58] Field of Search ........... 350/277, 288, 299, 303, 350/304, 307, 276 R; 296/84 B, 97 R, 97 B

[56] References Cited
UNITED STATES PATENTS

| | | | |
|---|---|---|---|
| 2,833,592 | 5/1958 | Lewis.......................... | 350/276 R X |
| 2,910,915 | 11/1959 | Harris......................... | 350/288 UX |
| 2,979,989 | 4/1961 | Calder......................... | 350/304 |
| 3,180,219 | 4/1965 | Ruiz et al.................... | 350/304 |
| 3,448,553 | 6/1969 | Herr et al. .................. | 350/288 X |
| 3,494,689 | 2/1970 | McGlinchy .................... | 350/307 |
| 3,508,815 | 4/1970 | Scheitlin et al................ | 350/288 |

FOREIGN PATENTS OR APPLICATIONS

| | | | |
|---|---|---|---|
| 1,068,571 | 11/1959 | Germany........................ | 296/97 R |
| 2,054,953 | 5/1972 | Germany........................ | 296/97 R |

Primary Examiner—John K. Corbin
Assistant Examiner—F. L. Evans
Attorney, Agent, or Firm—Ladas, Parry, Von Gehr, Goldsmith & Deschamps

[57] ABSTRACT

The invention concerns a motor vehicle accessory comprising an elongated backing member, soft protective material extending at least partly around the backing member, and at least one mirror mounted behind an aperture in the soft protective material, the said mirror being inclined at an angle to the longitudinal axis of the elongated backing member. The elongated member can be rigid and there conveniently are two mirrors inclined at an angle thereto. A transparent safety strip can extend in front of the mirrors.

1 Claim, 3 Drawing Figures

COMBINED REAR VIEW MIRROR AND SUNVISOR

GENERAL FIELD OF THE INVENTION

This invention relates to motor vehicle accessories and more particularly to a mirror system for giving an improved rear view.

SUMMARY OF THE INVENTION

The present invention provides a motor vehicle accessory comprising an elongated member having soft protective material extending at least partly around it and at least one mirror mounted therein behind an aperture in the soft protective material, the mirror being inclined at an angle to the longitudinal axis of the elongated member.

Conveniently, the soft protective material is provided completely around the edge of the mirror and protruding forwardly of the mirror face. For example, an aperture of the size and shape desired for the mirror can be formed in the soft protective material, and the mirror mounted behind the soft protective material. The soft protective material may be a foamed plastics material and may have a cover of washable plastics material over the front thereof.

The elongated member may comprise a rigid backing plate. The mirror may be of any suitable shape, for example square, rectangular, circular or oval. One or more mirrors may be provided in the motor vehicle accessory according to the invention. For example a single mirror may be inclined at an angle to the backing plate preferably so that if the backing plate is mounted in front of the driver of the vehicle, a clear view of the road behind him is visible without his having to turn his head.

Alternatively, a pair of mirrors, facing away from each other can be provided at angles inclined to the backing plate. The angle between each mirror and the backing plate may be the same. Such an accessory can be mounted directly in front of a driver of a motor vehicle, e.g. approximately where the sunvisor is usually positioned, so that the "blind spot area" is reduced. If desired, a normal rear view mirror may be positioned between the two inclined mirrors and also may have the soft protective material protruding forwardly of it. This further mirror may be parallel to the backing plate.

The mirrors may be attached at their rear surfaces onto a curved mounting member, e.g. onto a flexible strip bent to give a desired degree of curvature so that a good all-round view is obtained. A transparent strip or coating of plastics material can be provided in front of the mirrors so that there is no danger of an occupant cutting himself on any of the mirrors if his head strikes them in a collision.

Mounting means may be provided for mounting the elongated member in front of the driver of the motor vehicle. The mounting means may be of a size and shape to fit in the normal mounting for a sunvisor in a motor vehicle.

The vehicle accessory may have a sunvisor beneath the mirror(s). The sunvisor may be a transparent antiglare device, or be of non-transparent soft protective material. The sunvisor can be attached to the part of the motor vehicle accessory containing the mirror(s). The sunvisor may be mounted to be moved out of the way behind the part of the accessory containing the mirrors, when it is not required. For example the sunvisor may be slideable downwardly in a frame behind the mirrors, or may be hinged to the part of the accessory containing the mirrors so as to be pivotable behind that part.

The sunvisor may be lockable into a position at least partly behind the mirrors when it is not required. For example, a latch can be released to permit the sunvisor to slide down when it is required.

Means may be provided for adjusting the angle of the mirrors to the longitudinal axis of the elongated member to suit different drivers. The mirror(s) may be of plate glass and can be of any convenient size. Each may, for example, be 10 to 15 cm long, and 4 to 10 cm wide. The motor vehicle accessory may be 30 to 50 cm long.

DESCRIPTION OF THE DRAWINGS

The invention is illustrated by reference to the accompanying drawings, in which.

DETAILED DESCRIPTION OF THE INVENTION

Figure 1:
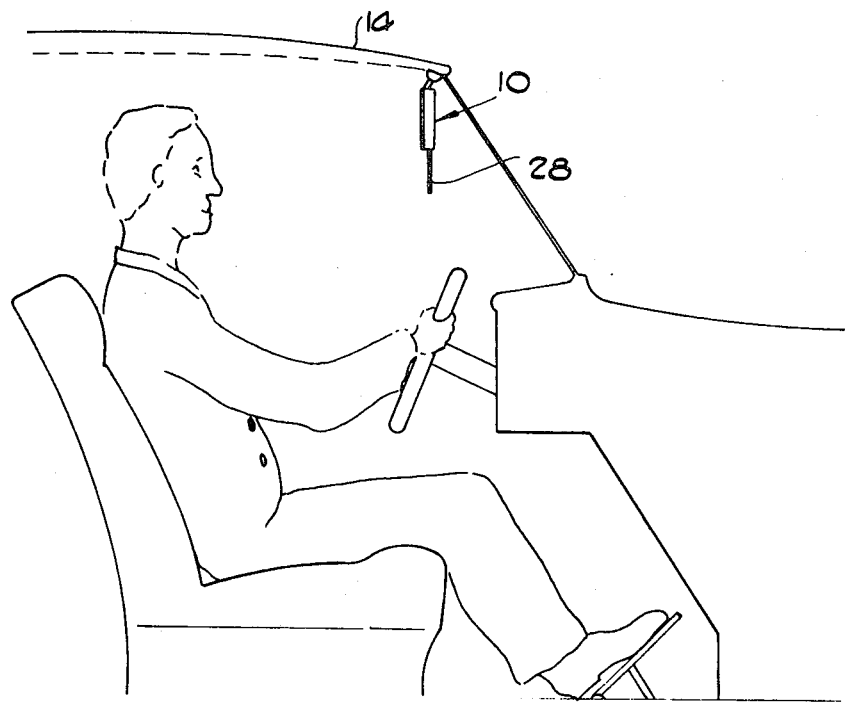
FIG. 1 is a side view of a motor vehicle accessory according to the invention.
Figure 2:
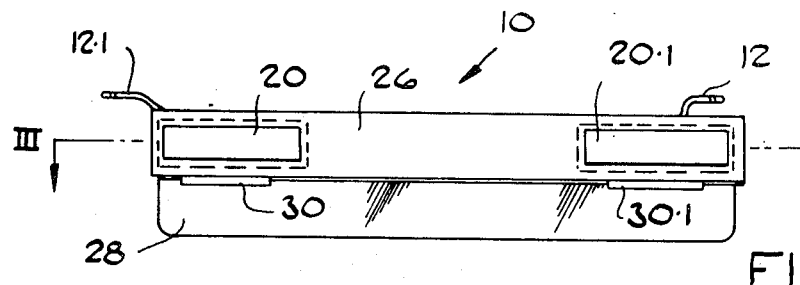
FIG. 2 is a front view of the accessory.
Figure 3:
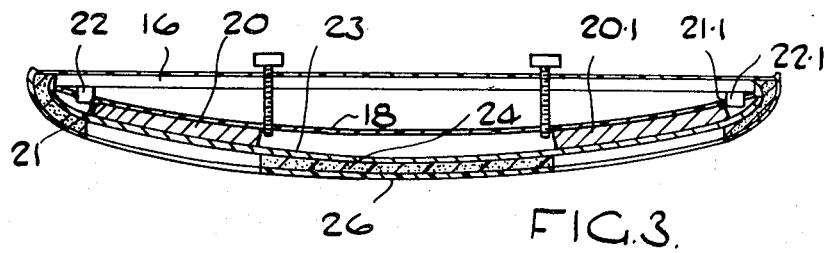
FIG. 3 is a section along II — II of FIG. 2.

In these figures, an accessory comprising an elongated member shown generally at 10 is mounted at 12, 12.1 in the interior of a motor car 14, so that it is directly in front of the driver, (i.e. in front of the right hand seat for right hand drive vehicles and in front of the left hand seat for left hand drive vehicles). The elongated member 10 comprises a backing board 16 on which a curved strip 18 of flexible plastics material has its ends mounted. Plane mirrors 20, 20.1 are adhesively attached at their backs to the curved strip 18, so that the mirrors are at an angle to each other. The mirrors 20, 20.1 are pivotally attached at 21, 21.1 to protrusions 22, 22.1 from the backing board 16. A transparent strip 23 of plastics material is mounted in front of the mirrors. Over this strip, there is provided a layer of soft plastics foam 24 having apertures cut therein at positions in front of the mirrors. A washable plastics sheet 26 surrounds the complete accessory. A sunvisor 28 is hinged at 30, 30.1 so that it may fold behind the back of the mirrors when it is not required. Adjustable bolts 32, 32.1 are screwed through the backing board 16 into the curved strip 18, so that the angle of the mirrors to the backing board can be altered as necessary.

With the accessory illustrated, there is little danger of facial injury to the driver of the vehicle in a collision since the mirrors are inset behind foamed plastics material, and are protected by the front strip 22. Also, good all-round vision is obtained. The sizes of the accessory will depend on the size of the vehicle. An advantage of the present invention is that there will be only a single image of a following vehicle in one mirror or the other, depending on which side of the car the following vehicle is. Thus confusion as to the number of following vehicles can be avoided. Blind spots can be practically eliminated, and wing mirrors made superfluous, with correct positioning of the mirrors in the accessory according to the invention.

I claim:

1. A motor vehicle accessory for improving the rearward vision of a driver of a motor vehicle, said accessory comprising an elongated backing plate, a pair of mounting arms adjacent the ends of said backing plate, said mounting arms projecting outwardly from the backing plate for enabling the accessory to be mounted on mounting means directly in front of the driver inside the vehicle, a flexible mirror support plate of longer length than the backing plate, said mirror support plate extending forwardly of the backing plate and having its ends attached to the backing plate, a pair of mirrors having their backs attached to the mirror support plate and their faces inclined away from each other, each mirror having adjustment means associated therewith for varying the angle of the mirror relative to the backing plate, a transparent strip of plastics material extending over the front of both mirrors, a layer of soft protective material extending over the front of and at least partly behind the accessory, said soft protective material containing apertures at positions in front of the mirrors, and a sun visor panel hingedly mounted to the accessory adjacent the lower edge of the elongated backing plate.

* * * * *